(12) United States Patent
Nguyen et al.

(10) Patent No.: US 7,262,520 B2
(45) Date of Patent: Aug. 28, 2007

(54) ROBUST POWER DISTRIBUTION SYSTEMS AND METHODS

(75) Inventors: Cuong V. Nguyen, Redondo Beach, CA (US); Daniel W. Trimble, Torrance, CA (US); Robert W. McConnell, Rancho Palos Verdes, CA (US)

(73) Assignee: General Electric Company, Schenectady, NY (US)

( * ) Notice: Subject to any disclaimer, the term of this patent is extended or adjusted under 35 U.S.C. 154(b) by 478 days.

(21) Appl. No.: 10/707,496

(22) Filed: Dec. 18, 2003

(65) Prior Publication Data

US 2005/0134120 A1   Jun. 23, 2005

(51) Int. Cl.
*H02J 3/00* (2006.01)
*H02J 9/00* (2006.01)
*H02H 7/06* (2006.01)

(52) U.S. Cl. .............................. 307/86; 307/43; 307/65; 307/80; 307/84; 307/85; 361/20; 361/21

(58) Field of Classification Search .................. 307/43, 307/65, 80, 84, 85, 86
See application file for complete search history.

(56) References Cited

U.S. PATENT DOCUMENTS

| | | | | |
|---|---|---|---|---|
| 4,168,459 A | * | 9/1979 | Roesel, Jr. .................... 322/29 |
| 5,122,726 A | * | 6/1992 | Elliott et al. ................. 323/272 |
| 5,627,737 A | * | 5/1997 | Maekawa et al. .............. 363/40 |
| 6,107,784 A | * | 8/2000 | Nomiya et al. .............. 323/205 |
| 6,147,414 A | | 11/2000 | McConnell et al. ........... 290/52 |
| 6,198,174 B1 | | 3/2001 | Nims et al. ..................... 290/52 |
| 6,246,138 B1 | | 6/2001 | Nims ............................ 310/90 |
| 6,297,977 B1 | * | 10/2001 | Huggett et al. ................ 363/65 |
| 6,307,278 B1 | | 10/2001 | Nims et al. .................... 290/52 |
| 6,316,920 B1 | | 11/2001 | Huggett et al. ............. 323/207 |
| 6,329,798 B1 | | 12/2001 | Huggett et al. ............. 323/207 |
| 6,404,655 B1 | | 6/2002 | Welches ....................... 363/41 |
| 6,493,243 B1 | * | 12/2002 | Real ............................. 363/17 |
| 6,630,752 B2 | * | 10/2003 | Fleming et al. ............... 307/64 |
| 6,810,339 B2 | * | 10/2004 | Wills ........................... 702/65 |
| 6,960,843 B2 | * | 11/2005 | Yamamoto ................... 307/86 |
| 7,016,793 B2 | * | 3/2006 | Ye et al. ....................... 702/60 |
| 2002/0190525 A1 | * | 12/2002 | Worden et al. ............. 290/1 A |

\* cited by examiner

*Primary Examiner*—Michael Sherry
*Assistant Examiner*—Hal I. Kaplan
(74) *Attorney, Agent, or Firm*—Sutherland, Asbill & Brennan LLP

(57) ABSTRACT

The present invention provides systems and methods that allow for individual power sources to be disconnected and reconnected without interrupting the power supply from the other power sources and that allow for these power sources to provide power at substantially the same electrical parameters such as frequency, phase, and voltage.

28 Claims, 5 Drawing Sheets

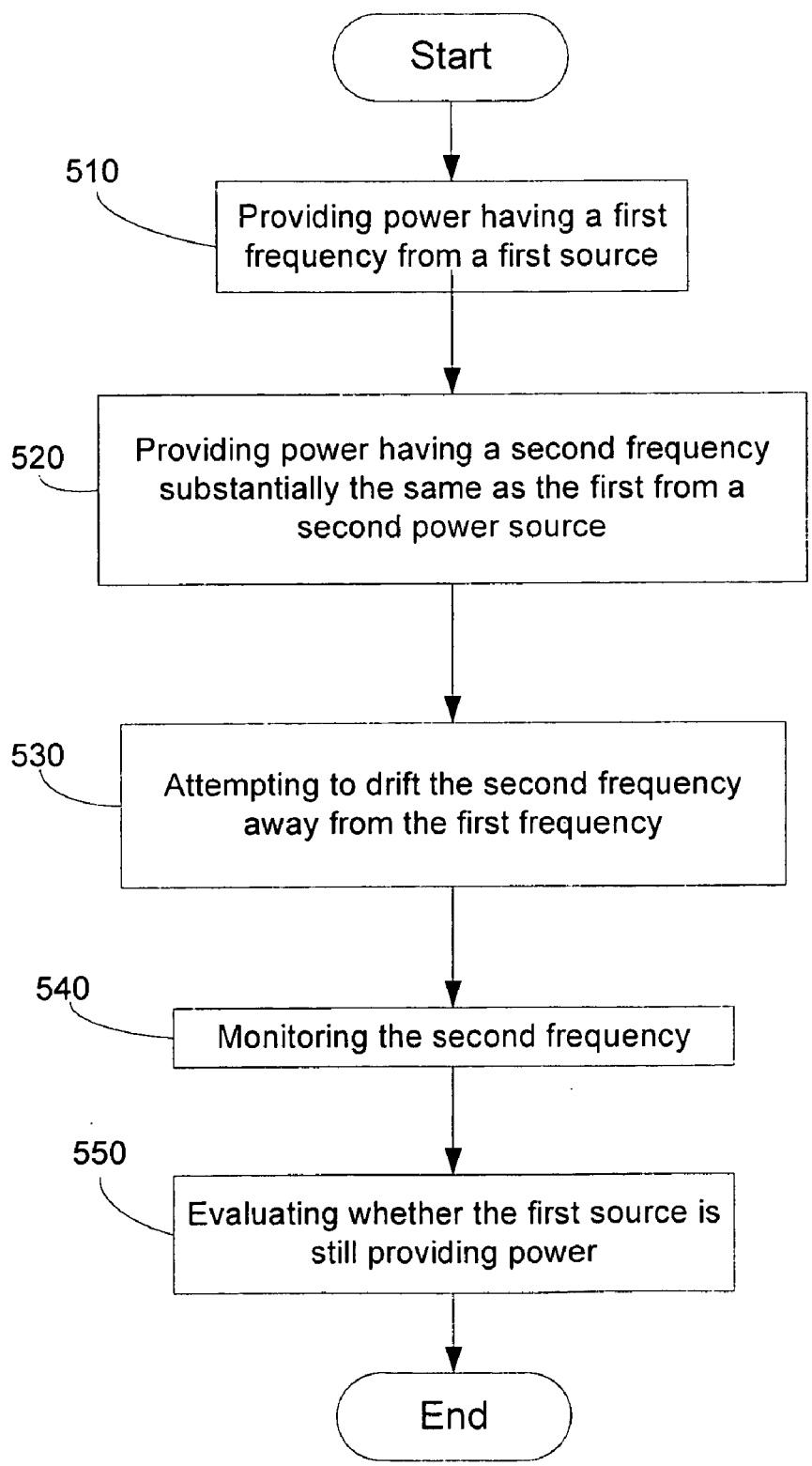

ROBUST POWER DISTRIBUTION SYSTEMS AND METHODS

BACKGROUND OF INVENTION

The present invention relates generally to power generation and distribution systems and methods. More particularly, the present invention relates to systems and methods for providing power through parallel operation of multiple power sources.

The United States Electric Power Research Institute (EPRI), which is the uniform research facility for domestic electric utilities, predicts that up to forty percent of all new electric power generation could be provided by distributed generators in the next few years. In other words, the traditional power grid that is used to provide power to consumers of electricity will increasingly be augmented or replaced with generators that may be located at the site of the demand or at a remote site and coupled via distribution lines.

Consumers of electricity can benefit from having a power generating system which uses multiple power sources. For instance, using multiple power sources provides a measure of redundancy in case one or more of the power sources becomes temporarily unavailable (i.e. "brownouts" and "blackouts" which are prevalent in many parts of the world). Besides providing redundancy, consumers may recognize a cost savings when using generators to augment or replace the power grid. Using multiple smaller generators allow the optimization of efficiency and/or system reliability based on the power demand at the site. Accordingly, power generating systems are increasingly using multiple power sources to provide power for consumers' loads.

When providing power using multiple power sources, the sources are often connected in parallel to the load. These power sources may include the traditional power utility grid. Depending on utility billing methods, it is quite possible to have significant reductions in utility costs i.e. peak shaving or improving power factor of energy drawn from the utility grid. However, some consumers choose to forego the traditional power grid entirely and instead solely use a number of power generators which could be operated in parallel, to meet their power demands. For instance, ten generators, each capable of providing a maximum of 75 kilowatts of power, could be operated in parallel to provide 750 kilowatts of power to a load.

Loads are often designed to operate using power having particular parameters such as a specific frequency, phase, and voltage. These loads also may have an acceptable range of deviation about the designed for value; power provided outside this acceptable range may degrade the performance of the load or even cause damage. Accordingly, it is desirable to provide power that has the proper values for these parameters or that is within the acceptable range based on the load's tolerance for deviations. Additionally, when power sources are operated in parallel, if the sources provide power having different parameters (i.e. different frequencies or voltages), then the sources will also act as loads to each other and the sources may receive unwanted power feedback from the other power sources. If power sources provide power having different frequencies and voltages, even for brief intervals, extreme transients in current and energy flows may be caused. This unwanted feedback may cause damage to the power sources and/or loads or degrade their performance.

Traditionally, if a group of generators is used to power a load, then one of the generators (often termed the master) provides the frequency, phase, and/or voltage for the other generators to use so that these parameters may be synchronized. For instance, one approach of operating multiple microturbine generators in parallel is to phase-lock each of the generators to a master oscillator. A synchronization signal (e.g., a synchronization frequency such as a 60 Hz signal) may be sent to each of the generators, such that each generator will phaselock onto the synchronization signal, ensuring that the voltage produced by each generator is exactly in-phase with the other generators. Similarly, if a load is powered by a combination of the grid and one or more generators, the generators would obtain the frequency, phase, and voltage to use for providing power to the load from sensing the parameters of the power delivered by the grid.

These power sources are often monitored for compliance with the acceptable range for power parameters and disconnected from the load when out of compliance. For instance, if the grid provides power that becomes out of the acceptable range for the parameters for the load, then it may be disconnected from the load. Likewise, if the generator that is providing the parameters for the other generators to use for power production becomes non-compliant and must be disconnected, then all of the associated generators also are disconnected and become unavailable to the load. Generators, including those acting as masters which may provide the synchronization parameters such as frequency, have many moving and mechanical parts thus increasing the likelihood of their breakdown and mechanical failure. This may cause the loss of power to the load since no valid reference signal is available to the remaining generators. Further, the power generating system may be unable to meet the power demands of the consumer with only the remaining power sources.

Even if a disconnected power source returns to compliancy (i.e. having power with parameters within the acceptable range) with the parameter ranges, the other power sources often must be shut down before the disconnected power source can be reconnected. This shutdown is often necessary because the power provided by the remaining connected power sources may be at a value different than the disconnected power source that is now again within the acceptable range. If the source is reconnected without synchronizing the values such as frequency, phase, and/or voltage, one or more of the power sources may receive unwanted power feedback. This shutdown may cause the user to suffer losses from the shutdown in lost time and start-up costs.

Further, when sources are connected in parallel and one source is providing sufficient power to the load, the system may be unaware if other power sources become unavailable. Thus, the power system could be unaware that it is unable to meet increased demand that outstrips the ability of the remaining power sources. Further, the system could be unaware if a graceful shutdown is needed in the event of the failure of the remaining power sources. The need for shutdowns may be decided by the remaining generators becoming overloaded for a defined time interval. Also, large overloads may cause high currents and low voltages which also may require a shutdown.

Therefore, a need exists for systems and associated methods that allow for individual power sources to be disconnected and reconnected without interrupting the power supply from the other power sources and that allow for these power sources to provide power at substantially the same power parameters such as frequency, phase, and/or voltage.

A further need exists for systems and methods that allow for the power system easily to determine if a power source becomes unavailable.

SUMMARY OF INVENTION

The present invention provides systems and methods that allow for individual power sources to be disconnected and reconnected without interrupting the power supply from the other power sources and that allow for these power sources to provide power at substantially the same power parameters such as frequency, phase, and voltage. The present invention also provides systems and methods that allow for a determination if a power source becomes unavailable.

One aspect of the present invention is a method for supplying power to a load using multiple power sources which includes the steps of providing power having a first value of a parameter from a first power source to the load; monitoring the first value; providing power having a second value of the parameter from a second power source to the load, wherein the second value is substantially the same as the first value when the first value is within a range of values for the parameter and otherwise is within the range when the first value is outside the range; disconnecting the first power source from the load when the first value is not within the range; and reconnecting the first power source to the load when the first value is within the range and while the second power source continues to provide power to the load.

Another aspect of the present invention provides a method of supplying power to a load using a plurality of generators, which includes the steps of connecting the plurality of generators to the load; providing a synch frequency from a controller which is not a component of a generator; and providing power from each of the plurality of generators to the load wherein the power provided by each of the generators comprises a frequency which is substantially the synch frequency.

Another aspect of the present invention provides a power generating system, which includes a generator including an inverter capable of producing an output waveform having a frequency to power a load; and a controller connected to the generator wherein the controller is capable of providing the frequency for producing the output waveform and is operative to drift the frequency to substantially match a frequency from a second power source.

Another aspect of the present invention provides a power distribution system, which includes a load; a grid power source connected to the load which provides power having a grid frequency; a generator connected to the load which provides power having a generator frequency; a controller connected to the generator wherein the controller is operative to provide the generator frequency to the generator and is operative to drift the generator frequency to the grid frequency; and a sensor connected to the grid power source and to the controller that measures a grid operating condition.

Another aspect of the present invention provides a method for detecting whether a potential power source is still providing power to a load, which includes the steps of providing power having a first frequency from a first power source to the load; providing power having a second frequency from a second power source to the load wherein the second frequency is substantially the same as the first frequency; attempting to drift the second frequency of the power from the second power source away from the first frequency of the power from the first power source; monitoring the second frequency of the power provided by the second power source; and evaluating whether the first power source is providing power to the load.

Other features of the present invention will become apparent upon review of the following detailed description, when taken in conjunction with the drawings and the appended claims.

BRIEF DESCRIPTION OF DRAWINGS

FIG. 5 is a flowchart illustrating a method for detecting whether a power source that was connected to the load is still providing power to a load in accordance with one embodiment of the present invention.

DETAILED DESCRIPTION

Figure 1:
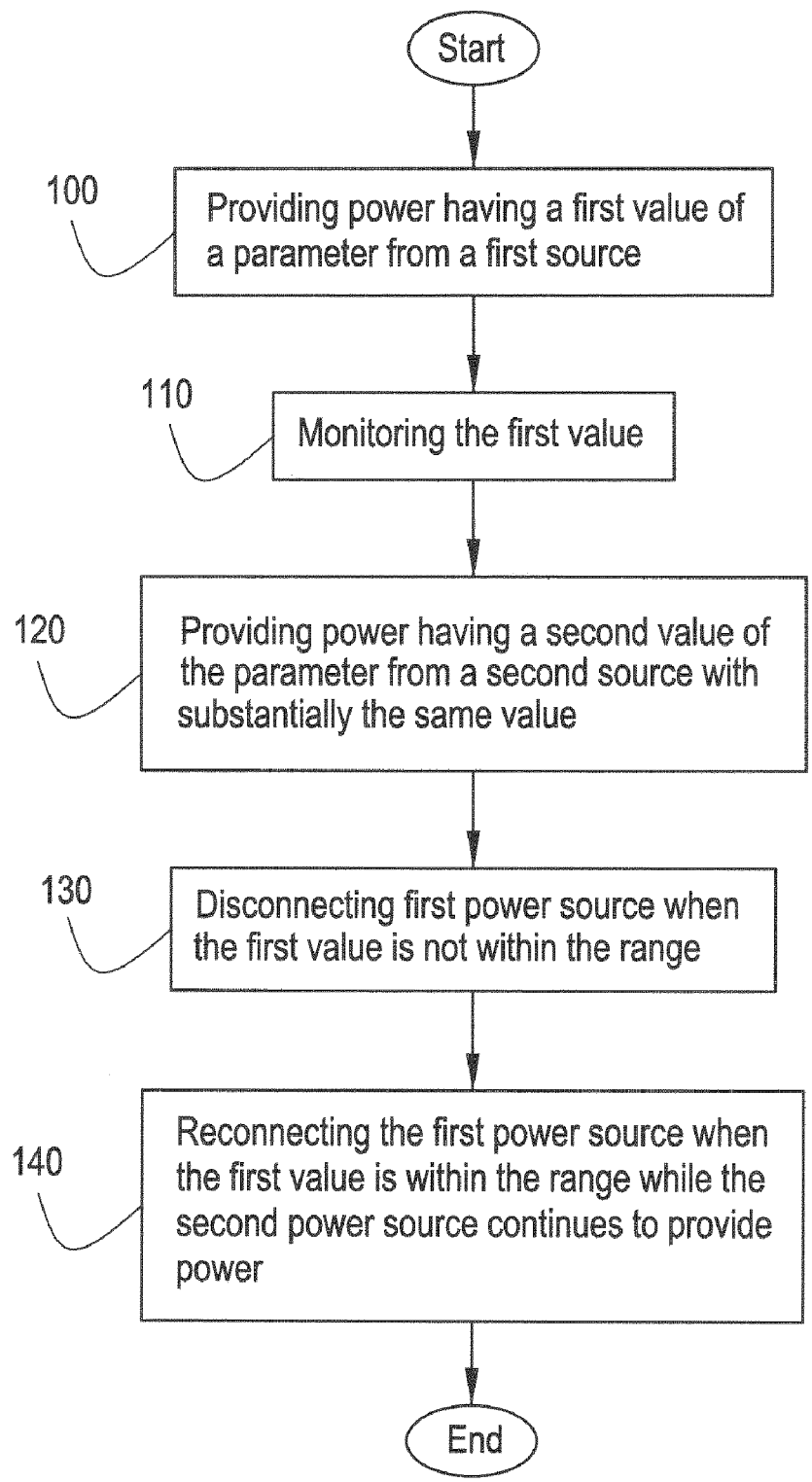
FIG. 1 is a flowchart illustrating a method that may be used for supplying power to a load using multiple power sources in accordance with one embodiment of the present invention.

The present invention provides systems and methods that allow for individual power sources to be disconnected and reconnected without interrupting the power supply from the other power sources and that allow for these power sources to provide power at substantially the same power parameters such as frequency, phase, and voltage. The present invention will now be described more fully hereinafter with reference to the accompanying drawings, in which preferred embodiments of the invention are shown. This invention may, however, be embodied in different forms and should not be construed as limited to the embodiments as set forth herein. Rather, these embodiments are provided so that this disclosure will be thorough and complete, and will convey the scope of the invention to those skilled in the art. The elements of the drawings are not necessarily to scale, emphasis instead being placed upon clearly illustrating the principles of the present invention. Furthermore, like reference numbers refer to like elements throughout.

Power generation systems often include a number of power sources. These multiple sources may include the utility power grid and any number of power generators. The utility power grid acts as an infinite load and often provides the voltage, phase, and frequency parameters for the power supplied to the load. Power generators such as microturbines often use the voltage, phase, and frequency parameters of the grid when providing power so that these parameters are synchronized or are at a minimum deviation so as to eliminate or reduce power mismatches that may cause the power generators to appear as a load and receive unwanted power feedback.

Microturbines usually include a compressor, a turbine, an integrated electrical generator and a controller. The compressor, the turbine and the electrical generator may be rotated by a single common shaft. During operation of a microturbine generator, air enters an inlet of the compressor and is compressed. Compressed air leaving an outlet of the compressor is circulated through cold side air passages in a recuperator. Inside the recuperator, the compressed air absorbs heat from the turbine exhaust. The heated, compressed air leaving the cold side of the recuperator is supplied to a combustor. A gaseous or liquid fuel is also supplied to the combustor. Within the combustor the fuel and compressed air are mixed and ignited. Hot, expanding gases resulting from combustion are expanded through the turbine, thereby creating turbine power. The turbine power, in turn, drives the compressor and the electrical generator.

A microturbine useful with the present invention may be a microturbine sold under the mark "Parallon 75®" by General Electric Corporation of Schenectady, N.Y. Generally described, the "Parallon 75®" microturbine includes a turbine, a compressor, and a two-pole permanent magnetic generator rotor mounted on a single high-speed shaft via a number of air bearings. The "Parallon 75®" microturbine may generate about 75 kilowatts (75 kW) of electricity. Other microturbines useful with the present invention include the C30, sold by Capstone Turbine Corp of Chatsworth, Calif. and similar types of devices.

The generator may be a ring-wound, two-pole toothless (TPTL) brushless permanent magnet machine having a permanent magnet rotor and stator windings (although other types of machines may be used). The rotor is attached to the shaft. When the rotor is rotated, an alternating voltage is induced in the stator windings. Variations in the turbine speed will produce a variation in the frequency of the alternating current generated by the electrical generator. However, the variable-frequency ac power is often rectified to dc power by a rectifier, and the dc power may be converted to fixed frequency ac power by a solid-state electronic inverter. The controller can generate commands that cause the inverter to convert the dc power to ac power having particular parameters.

Power outputs of the generators are often connected to a distribution feeder line. Each generator supplies ac power to the distribution feeder line via its power output. One or more loads may be connected to the distribution feeder line. For simplicity, a single line diagram is used to represent the actual three-phase wire circuit.

The power distribution system may also include a utility power source providing electrical power. The utility power source provides electrical power over a transmission line having an inductive impedance forming part of a feeder distribution network to a load. The load may be of a variety of types, such as relatively constant resistive elements, or inductive elements such as motors or the like. Further, a load may include a single load or any combination of loads that are connected so that they may be powered by the multiple power sources. Loads are often represented by a single composite load having the combined real and reactive components of the individual loads and will be represented as such herein.

Aspects of the present invention provide for systems and methods for supplying power to a load using multiple power sources. These multiple power sources may be any combination of one or more generators, utility power grids, or any other source capable of supplying power having a desired parameter such as voltage and/or frequency. Typically, desired voltages include 120, 208, 240, 415, and 480 Volts and others based on the local grid voltage and desired frequencies include 50 Hertz and 60 Hertz; however, the present invention is not limited to any particular voltage or frequency. Types of generators that may be used as a power source include microturbines, turbogenerators, wind powers, photovoltaics, and fuel cells.

Referring now to FIG. 1, a method for supplying power to a load using multiple power sources in accordance with one embodiment of the present invention is illustrated. The process of supplying power to a load using multiple sources includes the step of having a first power source supply power at a desired value of a parameter to the load as shown in Block 100. Specifically, the power supplied by the first power source has electrical parameters, such as frequency, phase, and/or voltage that may be controlled and measured. Typically, loads are designed to operate at or within a range of a desired value for each of these parameters. Thus, it is often desirable to provide power to these loads at the desired value or within an acceptable tolerance range. For instance, many loads are designed to be powered by sources producing power at 50 or 60 Hertz. These same loads typically have a tolerance range of three percent, and thus, a source providing power at or within a range of one percent of 50 or 60 Hertz would be providing the power at substantially 50 or 60 Hertz respectively. However, a greater range may be possible for loads that are less sensitive to deviations from the desired value for the parameter. Likewise, a smaller deviation may be required by a load.

The power provided by the first power source is then monitored to track the value of one or more of these parameters as shown in Block 110. This monitoring process may be continuous or may be at any sampling rate that is sufficient to allow the recognition of power being supplied at out of range values soon enough to disconnect the offending power source from the load so that damage to the load will not occur or will be minimized and sufficient to allow a parameter to be drifted to maintain an acceptable deviation, if any. Thus, the minimum desirable sample rate is often dictated by the sensitivity of the load and/or power source to fluctuations in the parameter. A typical sampling rate is 1 millisecond. Of course, any sampling rate may be chosen by the user.

Many of these steps may be provided in a number of different orders. For instance, both sources may provide power to the load before any monitoring is done. Thus, the ordering of these steps is merely illustrative and should not be deemed a limitation. Likewise, the steps of the other illustrative methods provided herein should not be deemed to be ordered in a required procession.

A next step in accordance with one embodiment of the present invention, is having a second power source supply power at a value of the parameter to the load such that the value of the parameter is substantially the same as the value of the parameter of the power produced by the first power source when the first power source is supplying power to the load as shown in Block 120. The second power source may obtain the value of the parameter of the power from the first power source from the monitoring of the first power source. If the first power source is no longer supplying power to the load then the second power source may supply power to the load at a fundamental value that can be generated independently by the second power source. For instance, the second power source could supply power having a frequency of substantially 50 or 60 Hertz using a default frequency generator that may be included within or connected to the generator. In other embodiments of the present invention, the second power source can supply power to the load using a value that was previously monitored from the power produced by the first power source. This previously monitored value may include the last monitored value that was within the range of values for the parameter. This monitored value may be stored in a memory device. In still other embodiments of the present invention, the value of the parameters of the power from the second power source is drifted from its value when the first power source is disconnected from a default frequency.

If the first power source is not within a certain range of the desired value for the parameter, the first power source is disconnected from the load as shown in Block 130. The power from the first power source is monitored as before and if and when the value of the parameter of the power is within the range, the first power source is reconnected to the load while the second power source continues to provide power to the load as shown in Block 140. In some embodiments of the present invention, the value of the parameter of the second power source is first drifted towards the value from the first power source until it is substantially the same as the value of the parameter for the first power source and then the first power source is reconnected to the load. Typically, values are substantially the same when a deviation's effect, if any, on the system is acceptable to the user, manufacturer, or other third party.

The first power source can be disconnected from the load by causing the connection between the first power source and the load to become an open circuit. For instance, a switch in series with the load and the first power source can be opened so as to prevent the load from being driven by the first power source. Similarly, the switch can be caused to be closed to reconnect the power source when it is desired that the first power source again provide power to the load.

In one embodiment of the present invention, the first power source supplying power to the load is a grid power source such as provided by an electric utility company and the second power source is one or more generators, such as a microturbine or turbogenerator. In another embodiment of the present invention, the first power source is one or more generators and the second power source is a grid power source. In yet another embodiment of the present invention, the first power source is one or more generators and the second power source is also one or more generators.

In one embodiment of the present invention the desired parameter for consideration is frequency. In another embodiment of the present invention the relevant parameter of the power is voltage. Of course, these parameters may be monitored and power provided having these parameters in accordance with the present invention. In still other embodiments of the present invention, the desired parameters may include phase.

In other embodiments of the present invention, the range of values may be provided by the manufacturer of the generator, the user of the generator, or any interested third party. Providing this range may be accomplished by providing a low limit value and a high limit value which correspond to the ends of the range. These values may be stored within an electrical controller, within the generator, or within some other memory device which is well known to one of ordinary skill in the art.

The width of the frequency range may be specified by the generator's manufacturer, the user powering the load, or any other interested third party. Generally, the width of the frequency range may depend on the sensitivity of the load to deviations from the frequency for which the generator is designed to provide power. As above, typically power may be provided having a frequency of sixty Hertz which is common in North America or fifty Hertz which is common in Europe and other parts of the world. Typically, the frequency range for a load is 3% around a desired frequency and voltage range is 10% around a desired voltage. Again, a frequency which is substantially 60 Hertz for each of the generators is a prevalent frequency in many areas of North America including the United States. A prevalent frequency for other areas of the world may be 50 Hertz.

In accordance with the present invention, in power systems employing generators, the generators need not be in the same location as the load, but only need be connected in a fashion so that they may supply power to the load. For instance, in some embodiments the generators may be connected to the load via a distribution feeder line.

In some embodiments of the present invention, each generator may be individually disconnected from the load by overcurrent hardware and/or a software combination within each generator if the frequency for that generator is not within its associated frequency range for a specified period of time. In other words, if the frequency is outside the range for only a small amount of time, then the generator will not be disconnected from the load. This small amount of time may depend on the load and the tolerances of other generators. For instance, 5 milliseconds may be an acceptable time for the generator to produce power having a frequency outside the range without detrimentally impacting the system or the load. This specified period of time may be supplied by the manufacturer, user, or some other interested third party and may be stored along with the frequency ranges themselves or may be stored in another location or in another medium or device as is well known in the art.

Figure 2:
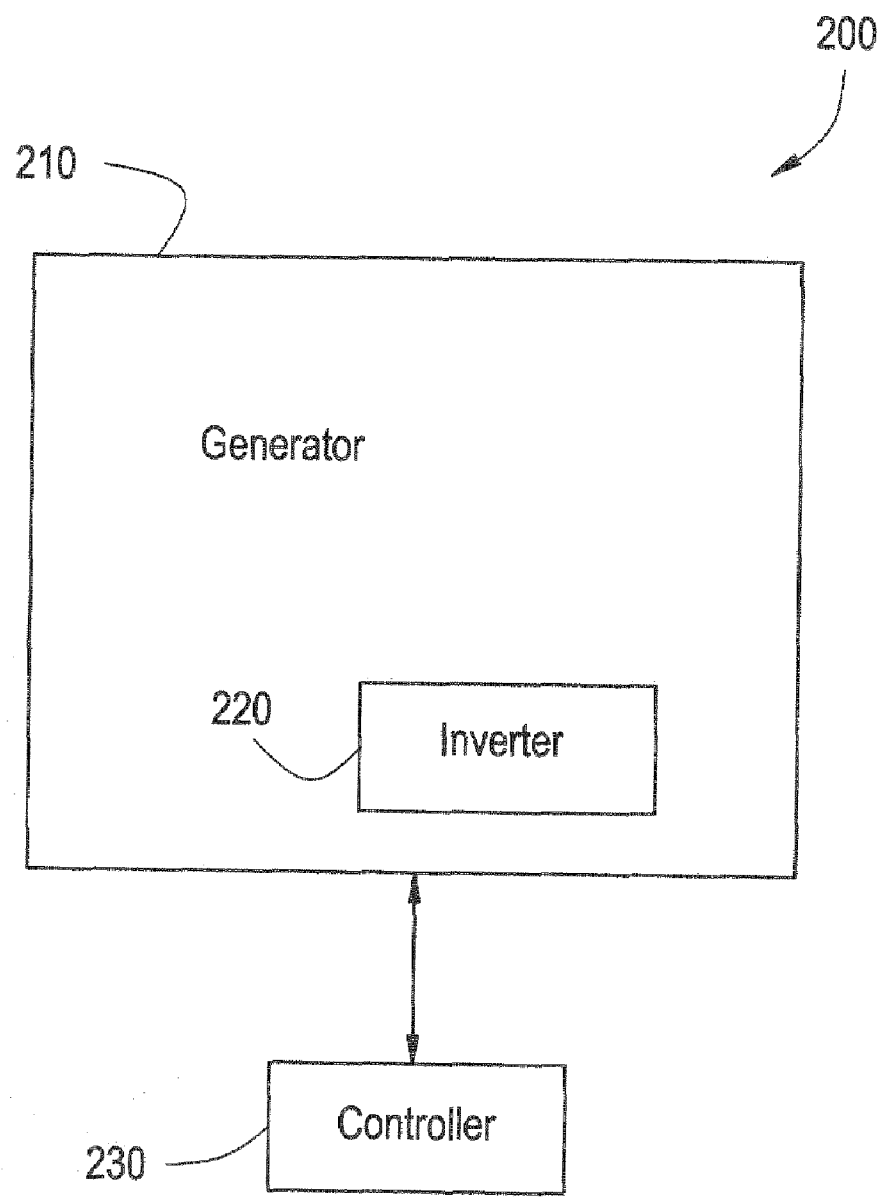
FIG. 2 is a block diagram of a power generating system using a generator in accordance with one embodiment of the present invention.

Referring now to FIG. 2, a power generating system 200 in accordance with one embodiment of the present invention is illustrated. This system 200 includes a generator 210 which has an inverter 220 capable of producing an output waveform having a frequency to power a load. The system 200 also includes a controller 230 which is external to and connected to the generator 210. The controller 230 is capable of providing the frequency for producing the output waveform and is operative to drift the frequency to substantially match a frequency from a second power source.

The controller 230 may provide control signals to the inverter 220 or the generator 210 may also include a separate controller, either internal or external, which provides control signals to the inverter to regulate the frequency of the output waveform. Regulation of the operation of the inverter is accomplished, for example, using pulse width modulation (PWM). PWM methods and apparatus are well known in the art.

Figure 3:
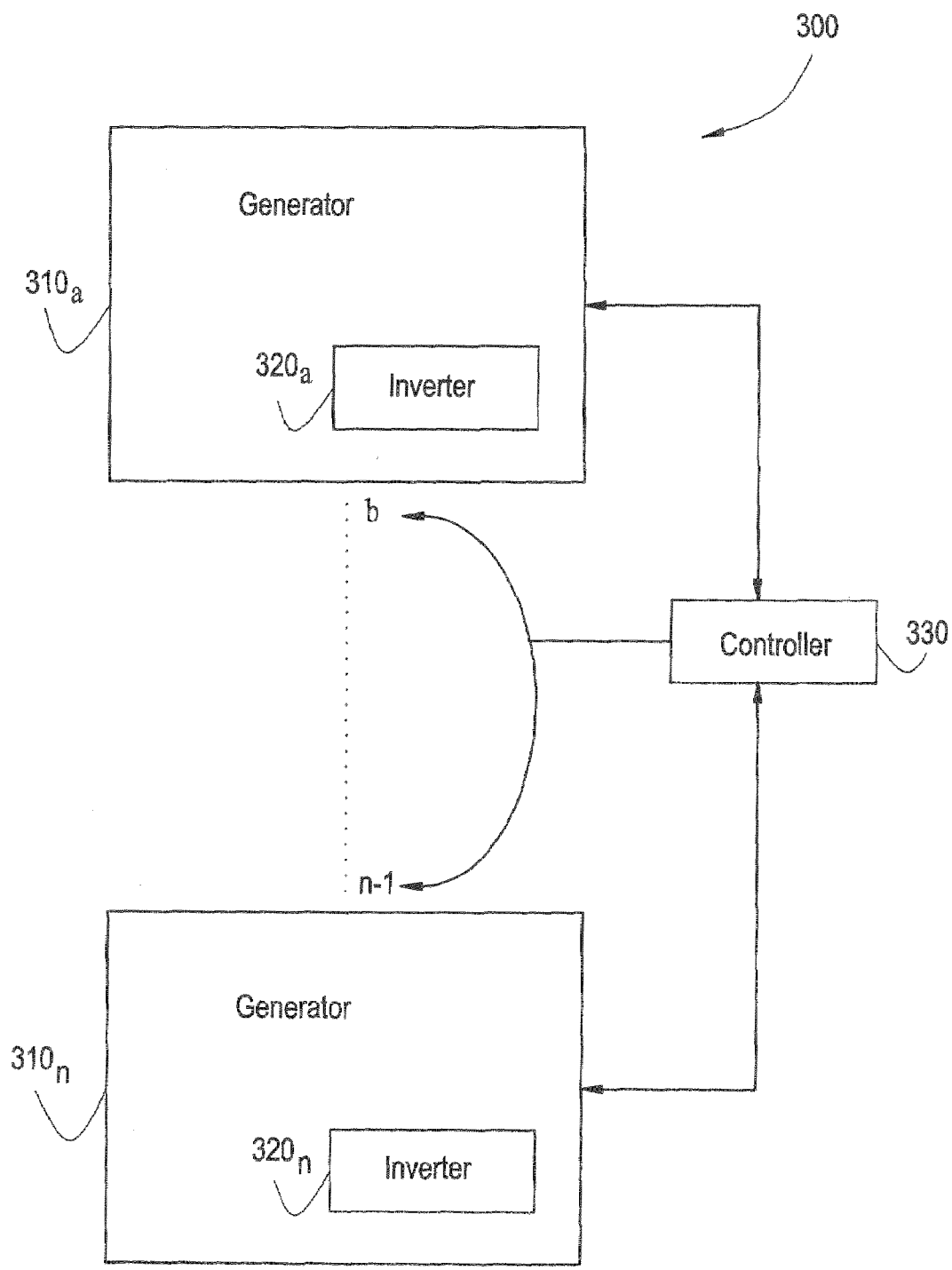
FIG. 3 is a block diagram of a power generating system using more than one generator in accordance with one embodiment of the present invention.

Referring now to FIG. 3, a power generating system 300 in accordance with one embodiment of the present invention is illustrated. This power generating system 300 includes a plurality of generators 310*a-n*. Each generator 310*a-n* includes an inverter 320*a-n* which is capable of producing an output waveform having a frequency to power a load. This power generating system 300 further includes a controller 330 external to the generators wherein the controller 330 is connected to each of the plurality of generators 310*a-n* and wherein the controller 330 provides to each generator 310*a-n* the frequency for producing the output waveform and is operative to drift this frequency.

Figure 4:
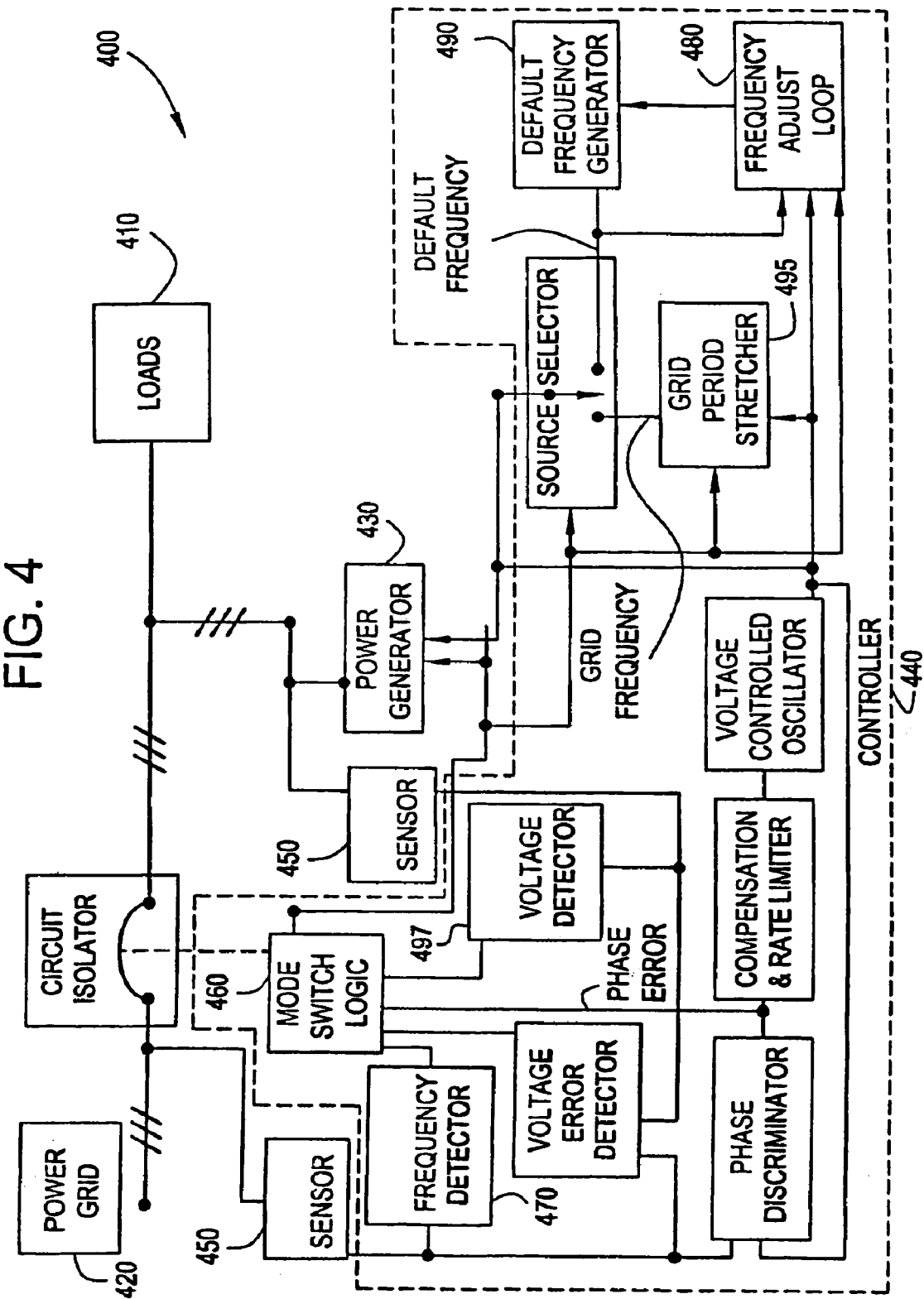
FIG. 4 is a block diagram of a power distribution system in accordance with one embodiment of the present invention.

Referring now to FIG. 4, a power distribution system 400 in accordance with one embodiment of the present invention is illustrated. This power distribution system 400 includes a load 410 which is connected to a grid power source 420 and a generator 430. The grid power source 420 is operative to provide power having a frequency to the load 410. The power provided by the generator 430 to the load 410 also has a frequency. This illustrative system 400 also includes a controller 440 which is connected to the generator 430. The controller 440 is operative to provide the frequency to the generator 430. The generator 430 uses the frequency to produce power having that frequency. The controller 440 also is operative to disconnect the grid power source 420 from the load 410 if the frequency of the power provided by the grid power source 420 is not within a range of values. The controller 440 is further operative to drift the frequency used by the generator 430 in providing power to the frequency of the power provided by the grid power source 420. The illustrative system 400 also includes sensors 450 which is connected to the grid power source 420 and to the controller 440 that measures a grid operating condition. The sensors 450 may take many forms as is well known in the art including a potential transformer that measures the parameters and relays the waveform at a lower voltage to the controller 440. These grid operating conditions may include the frequency, voltage, and phase of the power provided by the grid power source 420. In some embodiments of the present invention, the controller 440 is also operative to disconnect the grid power source 420 from the load 410 if the voltage of the grid power source 420 is outside the range of values.

In some embodiments of the present invention the controller 440 also includes a mode switch logic device 460 that is operative to disconnect and reconnect a power source. The mode switch logic device may be implemented using discrete solid state components or may be implemented using software executed on a processor or some combination thereof. The mode switch logic device 460 contains the digital logic to interpret the signals from sensors and compare them to the parameter range to evaluate whether the power source is out of range and should be disconnected. The mode switch logic device 460 also may contain the logic to evaluate whether a disconnected power source is again in the acceptable parameter range and should be reconnected.

In some embodiments of the present invention the controller 440 includes a frequency range detector 470 which determines if the frequency of the power of a power source is within the frequency range. The frequency range detector 470 may be implemented as discrete solid state components or may be implemented using software executed on a processor or some combination thereof. The frequency range detector 470 may contain logic to evaluate whether the value of the parameter measured by the sensor 450 is within or not within a given frequency range. The frequency range detector 470 can reference the frequency range values which are stored in the grid sync controller. In some embodiments of the present invention the controller 440 also includes a frequency adjust loop 480 which operates to allow the frequency of a second power source to adjust to the frequency of the power from the first power source. The frequency adjust loop 480 may be implemented using a combination of hardware and software In some embodiments of the present invention, the controller 440 further includes a default frequency generator 490 that may be set to provide a frequency for power generation such as 50 or 60 Hertz. The default frequency generator may be implemented using a local oscillator or software executed on a processor containing a clock or any other device that allows for a periodic signal to be generated having the desired cycles per second.

In some embodiments of the present invention, the controller 440 further includes a grid period stretcher 495 which attempts to alter the frequency of the power for determining whether islanding has occurred. The grid period stretcher 495 may be implemented as a frequency drift output including a programmable rate and limits which may lengthen or shorten the period of the signal provided to the power source to attempt to increase or decrease the frequency of the resultant power.

In still yet other embodiments of the present invention, the controller 440 includes a voltage range detector 497 for determining when a power source is providing power outside a selected voltage range. The voltage range detector 497 may be implemented as discrete solid state components or may be implemented using software executed on a processor or some combination thereof The voltage range detector 497 may contain logic to evaluate whether the value of the parameter measured by the sensor 450 is within or not within a given voltage range.

The voltage range detector 497 can reference the voltage range values which are stored in the grid sync controller. The controller may incorporate many varied components such as a mode switch logic device, a frequency range detector, frequency adjust loop, default frequency generator, a frequency range detector, a grid period stretcher, and a voltage range detector in accordance with the present invention. Alternately, these components may be distributed as discrete devices or components of other devices within the overall system 400 in accordance with the present invention. Further, these components may be implemented as discrete solid state devices or as software executed on a processor or some combination thereof Additionally, not every component is required for every aspect of the present invention. For instance, a voltage range detector 497 is not required if frequency is the only desired parameter for consideration.

Another aspect of the present invention is the ability to detect if a power source becomes unavailable when multiple power sources are connected in parallel and the other sources are providing sufficient power to the load. A load can become isolated from a power source such as the grid if the grid becomes unavailable. This event is often termed islanding. For instance, if a load is connected to a generator and a grid power source and the generator is providing enough power, then the grid power source may not be actually supplying power to the load from the perspective of the load. If the grid becomes unavailable and the generator is supplying all of the power to the load, the power generating system could be unaware that the grid is no longer available. Thus, the power generating system may not gracefully shut down the system if the generator needs to be disconnected, assuming that the grid would supply the needed power.

Referring now to FIG. 5, a method for detecting whether a power source that was connected to the load is still providing power to a load in accordance with the present invention is illustrated. A first step is providing power having a first frequency from a first power source to the load as shown in Block 510. For instance, a utility could be providing power via the grid to a load at a frequency of 60 Hertz or within an acceptable tolerance such as plus or minus one percent. A next step is providing power having a second frequency from a second power source to the load wherein the second frequency is substantially the same as the first frequency as shown in Block 520. For instance, a generator could be providing power to the load at a frequency of 60 Hertz or within an acceptable range of the frequency of the power being supplied to the load by the grid. The next step is attempting to drift the second frequency of the power from the second power source away from the first frequency of the power from the first power source as shown in Block 530. For instance, the generator may try to alter slightly the frequency of the power it is providing to the load by raising or lowering the frequency by one percent or less. The next step is to monitor the second frequency of the power provided by the second power source as shown by Block 540. For instance, the frequency of the power outputted by the generator is measured. The next step is to evaluate whether the first power source is providing power to the load as shown in Block 550. In some embodiments, one or more generators serve as the second power source in providing power to the load. To evaluate whether the first power source is still providing power to the load, it is determined that the first power source is no longer providing power if the second frequency drifts away from the first frequency. Of course, it is determined that the first power source is still providing power if the second frequency does not drift away from the first frequency.

In the drawings and specification, there have been disclosed typical preferred embodiments of the invention and, although specific terms are employed, they are used in a generic and descriptive sense only and not for purposes of limitation. Further, it should be apparent that the foregoing relates only to the preferred embodiments of the present invention and that numerous changes and modifications may be made herein without departing from the spirit and scope of the invention as defined by the following claims and the equivalents thereof.

The invention claimed is:

1. A method for supplying power to a load using multiple power sources, comprising:
    providing power comprising a first value of a parameter from a first power source to the load; monitoring the first value;
    providing power comprising a second value of the parameter from a second power source to the load,
    wherein the second value comprises substantially the first value when the first value is within a range of values for the parameter and is within the range when the first value is outside the range;
    disconnecting the first power source from the load when the first value is not within the range; and
    reconnecting the first power source to the load when the first value is within the range and while the second power source continues to provide power to the load.

2. The method of claim 1, wherein the parameter comprises frequency.

3. The method of claim 2, wherein the parameter comprises frequency and the first value comprises substantially 50 Hertz.

4. The method of claim 2, wherein the parameter comprises frequency and the first value comprises substantially 60 Hertz.

5. The method of claim 1, wherein the parameter is voltage.

6. The method of claim 1, wherein the parameter comprises phase.

7. The method of claim 1, further comprising storing the first value of the parameter.

8. The method of claim 7, wherein the step of storing the first value comprises storing the first value that comprises a last monitored first value that is within the range for the parameter.

9. The method of claim 1, further comprising the step of drifting a second value of the parameter to a fundamental value.

10. The method of claim 1, wherein providing power from a first power source to the load comprises providing power from a grid power source.

11. The method of claim 1, wherein providing power from a first power source to the load comprises providing power from one or more generators.

12. The method of claim 1, wherein the step of providing power from a second power source to the load comprises providing power from one or more generators.

13. The method of claim 12, wherein the step of providing power from one or more generators comprises providing power from one or more microturbines.

14. The method of claim 1, wherein the step of providing power from a second power source to the load comprises providing power from a grid power source.

15. The method of claim 1, wherein reconnecting the first power source to the load comprises drifting the second value of the parameter of the second power source towards the first value of the first power source when the first value becomes within the range while the second power source continues to provide power to the load and reconnecting the first power source to the toad when the first value and the second value are substantially the same.

16. A power distribution system, comprising:
    a load;
    a grid power source connected to the load which provides power having a grid frequency;
    a generator connected to the load which provides power having a generator frequency;
    a controller connected to the generator, wherein the controller comprises a default frequency generator which provides the generator with a default frequency to provide power when disconnected from the grid power source, wherein the controller is operative to provide the generator frequency to the generator and is operative to drift the generator frequency to the grid frequency; and
    a sensor connected to the grid power source and to the controller that measures a grid operating condition, wherein the grid operating condition comprises the grid frequency.

17. A power distribution system, comprising:
    a load;
    a grid power source connected to the load which provides power having a grid frequency;
    a generator connected to the load which provides power having a generator frequency;
    a controller connected to the generator, wherein the controller comprises a grid period stretcher that attempts to alter the generator frequency to detect islanding conditions, wherein the controller is operative to provide the generator frequency to the generator and is operative to drift the generator frequency to the grid frequency; and
    a sensor connected to the grid power source and to the controller that measures a grid operating condition, wherein the grid operating condition comprises the grid frequency.

18. A method for detecting whether a potential power source is still providing power to a load, comprising:
    providing power having a first frequency from a first power source to the load;
    providing power having a second frequency from a second power source to the load wherein the second frequency is substantially the same as the first frequency;
    attempting to drift the second frequency of the power from the second power source away from the first frequency of the power from the first power source;
    monitoring the second frequency of the power provided by the second power source; and
    evaluating whether the first power source is providing power to the load.

19. The method of claim 18, wherein providing power from a first power source comprises providing power from a utility grid.

20. The method of claim 18, wherein providing power from a second power source comprises providing power from one or more generators.

21. The method of claim 18 wherein attempting to drift the second frequency of the second power source away from the first frequency comprises attempting to lower the second frequency.

22. The method of claim 18, wherein attempting to drift the second frequency of the second power source away from the first frequency comprises attempting to raise the second frequency.

23. The method of claim 18, wherein evaluating whether the first power source is still providing power to the load comprises determining that the first power source is no longer providing power if the second frequency drifts away from the first frequency.

24. The system of claim 16, wherein the controller comprises:
   a mode switch logic device that is operative to disconnect and reconnect a power source based on input from range detectors;
   a frequency range detector that is connected to the mode switch logic device and which determines if the grid frequency is within a range of values; and
   a frequency adjust loop that is operative to drift the generator frequency to the grid frequency.

25. The system of claim 17, wherein the controller comprises:
   a mode switch logic device that is operative to disconnect and reconnect a power source based on input from range detectors;
   a frequency range detector that is connected to the mode switch logic device and which determines if the grid frequency is within a range of values; and
   a frequency adjust loop that is operative to drift the generator frequency to the grid frequency.

26. A power distribution system, comprising:
   a load;
   a grid power source connected to the load which provides power having a grid frequency;
   a generator connected to the load which provides power having a generator frequency;
   a controller connected to the generator, wherein the controller comprises a default frequency generator which provides the generator with a default frequency to provide power when disconnected from the grid power source, wherein the controller is operative to provide the generator frequency to the generator and is operative to drift the generator frequency to the grid frequency; and
   a sensor connected to the grid power source and to the controller that measures a grid operating condition, wherein the grid operating condition comprises a voltage of the grid power source.

27. The system of claim 26, wherein the controller is further operative to disconnect the grid power source from the load if a voltage of the grid power source is outside a range of values.

28. The system of claim 26, wherein the controller comprises a voltage range detector that is connected to a mode switch logic device, wherein the voltage range detector determines if the voltage is outside a range of values.

* * * * *